(12) United States Patent
Organek et al.

(10) Patent No.: US 6,637,569 B1
(45) Date of Patent: Oct. 28, 2003

(54) BALL RAMP ACTUATOR WITH INDEXING PLATES

(75) Inventors: Gregory J. Organek, Whitefish Bay, WI (US); David M. Preston, Clarkston, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/143,324

(22) Filed: May 9, 2002

(51) Int. Cl.$^7$ ............................................. F16D 13/04
(52) U.S. Cl. ................... 192/35; 192/48.3; 192/54.52; 192/84.91; 192/84.93; 192/84.96
(58) Field of Search ................... 192/35, 48.3, 84.91, 192/84.93, 84.96, 48.2, 48.4, 54.52, 70.23, 84.7, 93 A

(56) References Cited

U.S. PATENT DOCUMENTS

| | | |
|---|---|---|
| 1,974,390 A | 9/1934 | Eason |
| 2,045,086 A | 6/1936 | Kastner |
| 2,091,270 A | 8/1937 | Colman |
| 2,605,877 A | 8/1952 | Winther |
| 2,649,941 A | 8/1953 | Doebeli |
| 2,738,045 A | 3/1956 | Mergen et al. |
| 2,816,636 A | 12/1957 | Weibel, Jr. |
| 2,861,225 A | 11/1958 | Mergen |
| 2,933,171 A | 4/1960 | Kraeplin |
| 2,937,729 A | 5/1960 | Sperr, Jr. |
| 3,000,479 A | 9/1961 | Mosbacher |
| 4,286,701 A | 9/1981 | MacDonald |
| 4,415,073 A | 11/1983 | Campbell et al. |
| 4,645,049 A | 2/1987 | Matsuda et al. |
| 4,718,303 A | 1/1988 | Fogelberg |
| 4,850,458 A | 7/1989 | Allan |
| 4,878,567 A | 11/1989 | Buckley et al. |
| 4,898,265 A | 2/1990 | Metcalf |
| 4,909,363 A | 3/1990 | Trommer |
| 5,070,975 A | 12/1991 | Tanaka et al. |
| 5,078,249 A | 1/1992 | Botterill |
| 5,092,825 A | 3/1992 | Goscenski, Jr. et al. |
| 5,106,349 A | 4/1992 | Botterill et al. |
| 5,160,004 A | 11/1992 | Scott et al. |
| 5,199,538 A | 4/1993 | Fischer et al. |
| 5,435,201 A | 7/1995 | Preston et al. |
| 5,441,137 A | 8/1995 | Organek et al. |
| 5,469,948 A | 11/1995 | Organek et al. |
| 5,485,904 A | 1/1996 | Organek et al. |
| 5,499,951 A | 3/1996 | Showalter |
| 5,505,285 A | 4/1996 | Organek |
| 5,528,950 A | 6/1996 | Organek et al. |
| 5,638,933 A | 6/1997 | Matsumoto et al. |
| 5,651,437 A | 7/1997 | Organek et al. |
| 5,713,445 A | 2/1998 | Davis et al. |
| 5,713,446 A | 2/1998 | Organek et al. |

(List continued on next page.)

FOREIGN PATENT DOCUMENTS

| | | |
|---|---|---|
| CA | 1 123 765 | 5/1982 |
| DE | 42 07 640 A1 | 9/1993 |
| GB | 2 235 957 B | 6/1993 |
| GB | 2 315 531 A | 2/1998 |

*Primary Examiner*—Saul Rodriguez
(74) *Attorney, Agent, or Firm*—Loren H. Uthoff, Jr.

(57) ABSTRACT

A ball ramp mechanism is used to apply an axial force in the same regardless of the direction of the flow of torque whenever there is relative rotation between an input shaft and an output hub using unidirectional grooves in both a control ring and an activation ring where a first index plate limits the rotation of the activation ring and a second index plate limits the rotation of the control ring relative to the input shaft. An electrical coil is used to induce a magnetic field in a coil pole to magnetically couple a coil armature to an intermediate plate and the intermediate plate to an activation plate to energize the ball ramp mechanism.

14 Claims, 5 Drawing Sheets

U.S. PATENT DOCUMENTS

| | | |
|---|---|---|
| 5,802,915 A | 9/1998 | Organek et al. |
| 5,810,141 A | 9/1998 | Organek et al. |
| 5,819,883 A | 10/1998 | Organek et al. |
| 5,910,061 A | 6/1999 | Organek et al. |
| 5,911,643 A | 6/1999 | Godlew et al. |
| 5,947,857 A | 9/1999 | Organek et al. |
| 5,953,959 A | 9/1999 | Organek et al. |
| 5,954,173 A | 9/1999 | Sakai et al. |
| 5,960,916 A | 10/1999 | Organek et al. |
| 5,964,330 A | 10/1999 | Organek et al. |
| RE36,502 E | 1/2000 | Organek et al. |
| 6,082,504 A | 7/2000 | Organek et al. |
| 6,109,408 A | 8/2000 | Ikeda et al. |
| 6,250,445 B1 | 6/2001 | Davis |
| 6,561,332 B2 * | 5/2003 | Organek et al. .............. 192/35 |

* cited by examiner

BALL RAMP ACTUATOR WITH INDEXING PLATES

RELATED APPLICATIONS

This application is related to application U.S. Ser. No. 09/940,821 entitled Ball Ramp Clutch With Frictional Damping and U.S. Ser. No. 10/143,325 and U.S.Ser. No. 10/143,33, all of which are assigned to the same assignee, Eaton Corporation, as this application.

FIELD OF THE INVENTION

The present invention relates to a ball ramp actuator which utilizes a ball ramp mechanism to apply a load or move another device, and more specifically, to a ball ramp actuator using a ball ramp mechanism to load or move another device where the relative rotation of the ball ramp mechanism is controlled through indexing plates to provide proper functioning regardless of the direction of torque flow through the ball ramp actuator.

PRIOR ART

The use of a ball ramp actuator to operate a driveline master clutch is known in the art. U.S. Pat. Nos. 5,441,137; 5,469,948; 5,505,285; 5,651,437; 5,810,141; 5,910,061; 5,964,330; and RE 36,502 assigned to the same assignee as this application, all of which are hereby expressly incorporated by reference, disclose methods of using a ball ramp actuator to supply the clamping force on a clutch disc and could, in the alterative, be used to supply a release force against a clutch apply spring.

Also shown in the prior art are other types of vehicle driveline devices which make use of a ball ramp mechanism to provide a clamping load on a clutch pack. U.S. Pat No. 5,092,825 discloses a limited slip differential having a clutch pack loaded by a ball ramp actuator. U.S. Pat. No. 5,499,951 discloses a driveline transfer case where the torque split is controlled by a ball ramp actuator. U.S. Pat. No. 5,528,950 discloses a transmission inertia brake where a ball ramp actuator loads a clutch pack to slow the rotation of a spinning transmission shaft. U.S. Pat. No. 5,819,883 discloses a driveline retarder in which a ball ramp actuator is used to load a clutch pack to rotate a hydraulic pump in response to a signal from a control unit. The disclosures of U.S. Pat. Nos. 5,092,825; 5,499,951; 5,528,950 and 5,819,883 are all hereby incorporated herein by reference.

The prior art ball ramp actuators used in the operation of a master clutch or other driveline coupling system such as a differential or transfer case could be improved by improving the inherent mechanical stability of the ball ramp. It would also be an advantage if the clutch remained fully engaged regardless of the direction of the flow of torque through the clutch when using a ball ramp mechanism with unidirectional grooves formed in the control and activation plates. Unidirectional grooves provide for increased separation distance capability since the axial depth variation in the grooves can be made greater because twice as much circumferential length is available as compared to a bi-directional groove.

Typically, a ball ramp mechanism is activated when an electrical current is supplied to a coil thereby producing an electromagnetic field in a coil pole which applies a retarding force to an armature which rotates with an input shaft. The rotating armature is nonrotatably connected to an annular control ring which has a plurality of control ramps or grooves formed in the face of control ring 20 which vary in axial depth. An annular activation ring which rotates with an output shaft has a like number of variable depth activation grooves formed therein which oppose those formed in the control ring where a corresponding number of rolling elements are trapped between the control and activation grooves. As a retarding force is applied to the control plate by the armature, the rotational movement of the control plate relative to the activation plate causes the rolling elements to simultaneously traverse the control grooves and the activation grooves thereby causing an increase in separation distance between the control and activation plates which is used to provide a clamping force on a clutch friction disc.

SUMMARY OF THE INVENTION

The present invention results in an improvement in the operational characteristics of a ball ramp actuator which can be used in a variety of vehicle driveline applications to provide a clamping load on a device such as a frictional clutch pack. The present invention provides for the same unidirectional apply ball ramp actuation function as disclosed in U.S. Ser. No. 09/940,821, assigned to the same assignee as this application, without using one-way clutches. Separate index plates are used to control the direction of rotation of both the control ring and the activation ring of the ball ramp mechanism, thereby functioning similar to the one-way clutches which they replace. In this manner, the reliability of the ball ramp mechanism is improved while manufacturing costs are reduced.

As taught in the U.S. Ser. No. 09/940,821 application, one-way clutches can be used to control the rotational direction of the control ring (plate) attached to the coil armature and the rotational direction of the activation ring (plate) to provide a continuous actuation function using unilateral grooves in the control ring and activation ring where the actuator force is maintained regardless of the direction of the flow of torque through the ball ramp mechanism. However, one-way clutches are expensive and not as reliable as the other components and the use of the index plates of the present invention in place of the one-way clutches results in a cost reduction with improved reliability.

The present invention provides the function of the one-way clutches using index plates which limit the degree of rotation of the control ring and the activation ring. The rotation limitation provided by the index plates is not exactly the same as provided with the one-way clutches, but for certain applications of a ball ramp mechanism, the functionality of the index plates is satisfactory. Specifically, a one-way clutch will lock-up during counter rotation after a relatively small degree of rotation on the order of one degree while the index plate of the present invention could allow as much as 240 degrees of rotation prior to lock-up. This 240 degrees of rotation is potentially operationally acceptable for use in many applications.

Thus, the present invention improves the performance and durability of a ball ramp actuator by eliminating the need for one-way clutches. Indexing plates are used to limit the relative rotational travel of the control ring and the actuation ring of the ball ramp mechanism which is used to apply an axial clamping load on a device such as a shift mechanism or a clutch pack. One indexing plate limits the rotation of the control ring of the ball ramp mechanism and a second indexing plate limits the rotation of the activation ring. Using the indexing plates of the present invention, the ball ramp mechanism, when energized, can only further move an actuator plate with relative rotation between the input and output shaft, thereby preventing any break in actuator torque. When the torque flows through, the ball ramp mechanism reverses direction. The indexing plates do not immediately prevent rotation in an undesired direction as with the one-way clutches disclosed in U.S. Ser. No. 09/940, 821 but the ramp position and clamp load are locked in by the activation plate, intermediate plate and armature until the index plates hit against respective stops formed on the control ring and the activation ring. At that point the clamp load could be increased.

The present invention also results in an improvement in the operational characteristics of a ball ramp mechanism which can be used in a variety of vehicle driveline applications to supply a load to another device, such as a frictional clutch pack. The present invention provides a unidirectional apply ball ramp function which applies the actuator plate regardless of the direction of torque flow from the input to the output along with significantly increased frictional damping in the ball ramp mechanism itself due to the slipping of the activation plate, intermediate plate and armature (pilot section) during ramp movement to control and stabilize the ball ramp mechanism thereby improving the operation of the actuator.

To improve the operation of the ball ramp mechanism, the stability is improved by significantly increasing the frictional damping using an intermediate plate disposed between the activation plate and the control plate where the intermediate plate rotates with the output shaft and hub. The activation plate rotates with the activation ring joined with a slip sleeve and the control plate rotates with an armature. Note that the torque flow from the input shaft to the output hub can be reversed so that the torque flows from the output hub to the input shaft and the ball ramp actuator system will continue to provide the desired functionality.

To activate the ball ramp mechanism an electrical current is applied to a coil assembly which generates an electromagnetic force that frictionally rotationally couples a coil armature, a control ring, an intermediate plate and the activation ring together. With the rolling elements positioned at the bottom of the grooves the index plates are oriented to only allow the control ring to rotate in an opposite direction to that of the activation ring. An activation plate rotates with the activation ring supported on the input shaft while the intermediate plate is driven by the output hub while the coil armature rotates with the control ring which is rotationally supported on the input shaft. Thus, the activation plate or armature will slip as required to allow the control ring to rotate relative to the activation ring so as to further increase the clamping load generated by the ball ramp mechanism.

One provision of the present invention is to provide a ball ramp mechanism to load an actuator plate where the load is maintained regardless of the direction of the flow of torque through the actuator system.

Another provision of the present invention is to provide a ball ramp mechanism to load an actuator plate where the load is maintained regardless of the direction of the flow of torque through the actuator system using index plates with the ball ramp mechanism.

Another provision of the present invention is to provide a ball ramp mechanism to apply a load where the frictional damping of the ball ramp mechanism is substantially increased to improve operation.

Still another provision of the present invention is to provide a ball ramp mechanism to provide a load and/or motion having improved operational characteristics.

DETAILED DESCRIPTION OF THE PREFERRED EMBODIMENT

Figure 1:
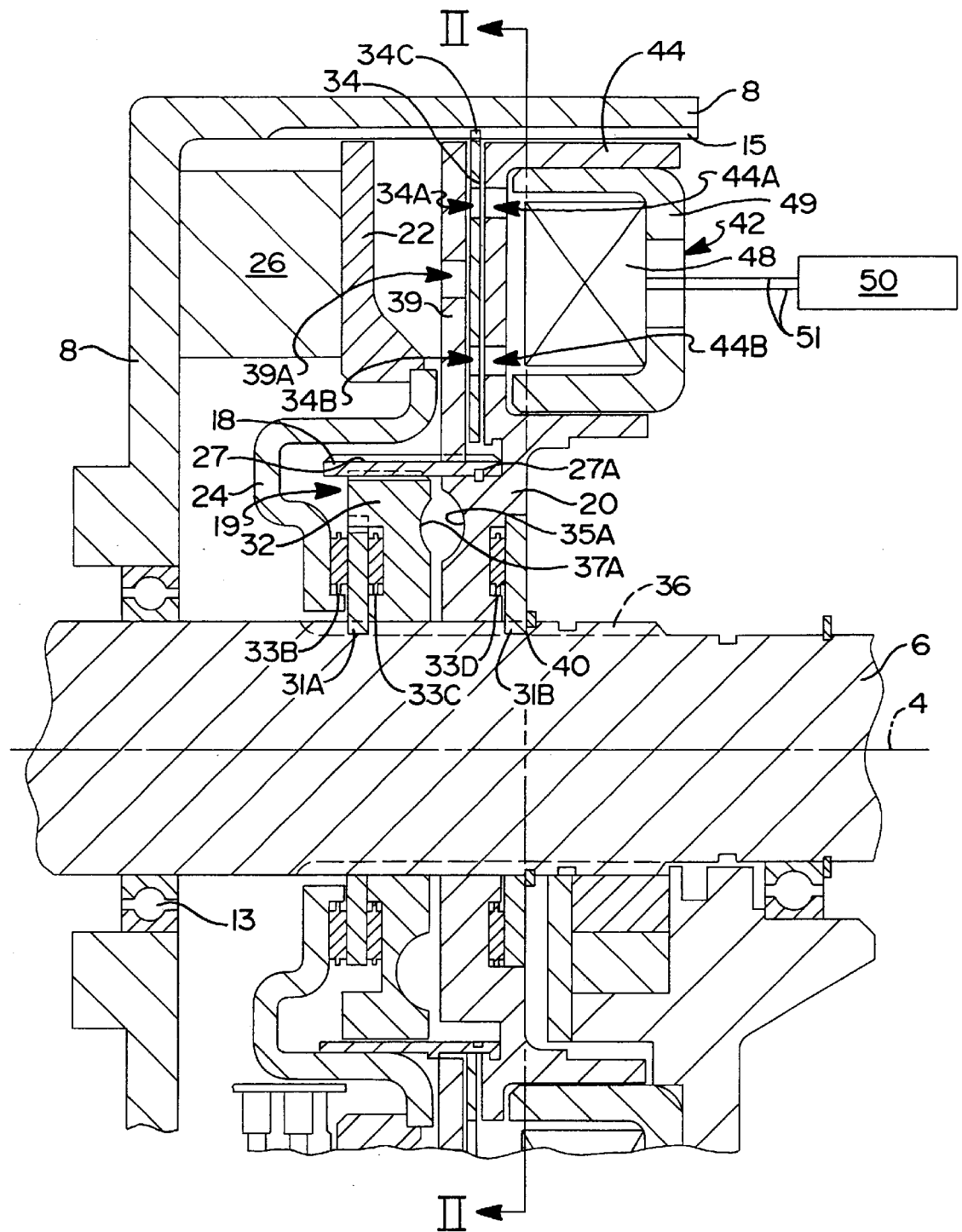
FIG. 1 is a cross-sectional view of the ball ramp actuator of the present invention.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Certain terminology will be used in the following description for convenience in reference only and will not be limiting. The terms "rightward" and "leftward" will refer to directions in the drawings in connection with which the terminology is used. The terms "inwardly" and "outwardly" will refer to directions toward and away from, respectively, the geometric center of the apparatus. The terms "upward" and "downward" will refer to directions as taken in the drawings in connection with which the terminology is used. All foregoing terms mentioned above include the normal derivatives and equivalents thereof.

Although primarily described for use in a vehicle driveline and more specifically as part of a master clutch, the present invention can be used to rotationally connect any two rotatable shafts in response to an electronic control signal. Such alternative devices could include differentials, engine retarders, transmission brakes, foundation brakes, inertia brakes, transfer cases and other devices.

Now referring to FIG. 1 of the drawings, a cross-sectional view of the ball ramp actuator 2 of the present invention is shown. An input shaft 6 which rotates about an axis of rotation 4 is normally connected to a power source such as an internal combustion engine (not shown). The ball ramp actuator 2 functions to move an actuator plate 22 when the input shaft 6 is rotating at a different speed from an output hub 8. For example, if the output hub 8 was grounded, the actuator plate 22, could be used to move a shift fork or compress a clutch pack 26 to apply a braking torque to the input shaft 6. In general, the elements which make up the ball ramp actuator 2 are annularly shaped and rotate about the axis of rotation 4. The output hub 8 is piloted on the input shaft 6. Splines 15 nonrotatably connect the output hub 8 to the intermediate plate 34 through teeth 34C. Splines 18 formed on the slip sleeve 27 nonrotatably connect the actuation ring 32. The input intermediate plate 34 which is nonrotatably connected to the drive hub 8 through splines 15 and splines teeth 34C.

The thrust bearings 33B, 33C and 33D axially position of various components contained in the ball ramp actuator 2. The first index plate 31A is axially supported through the thrust bearings 33B and 33C and the control ring 20 is axially supported through the thrust bearing 33D acting against the second index plate 31B which contacts the snap ring 40.

Figure 3:
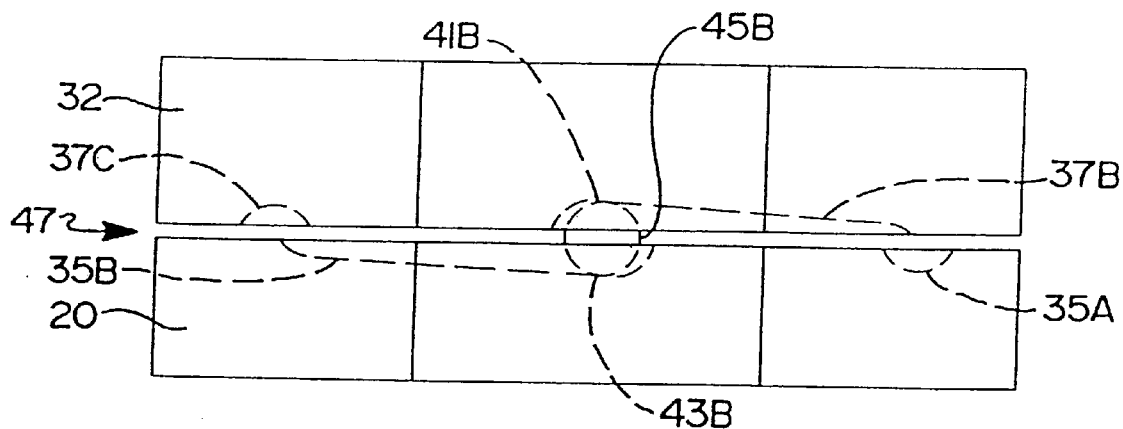
FIG. 3 is an illustrative partial view of the ball ramp mechanism in a nonactivated state taken along line III—III of FIG. 2.
Figure 4:
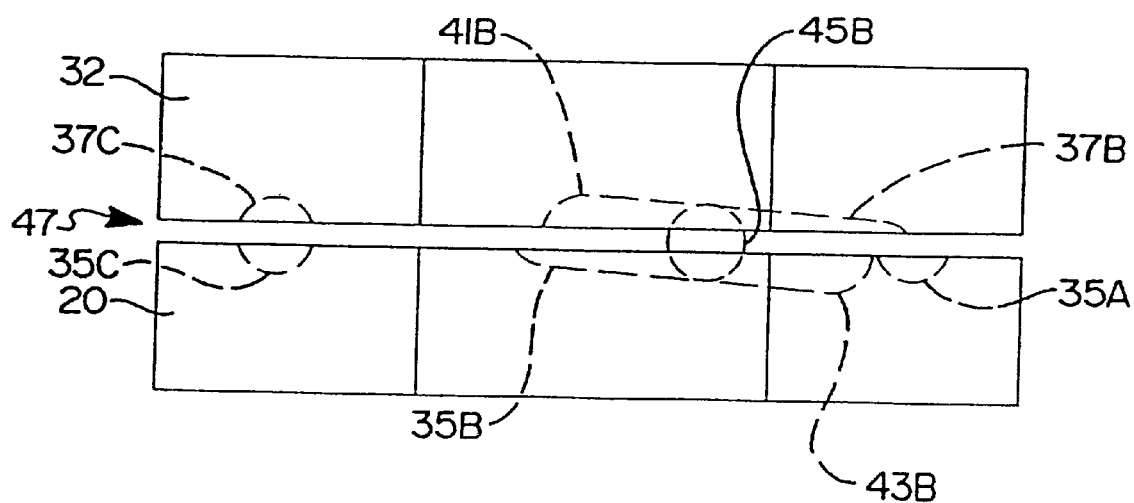
FIG. 4 is an illustrative partial view of the ball ramp mechanism in an activated state taken along line III—III of FIG. 2.

The ball ramp mechanism 19 is comprised of a control ring 20, an activation ring 32 and a plurality of rolling elements 45A, 45B, 45C (see FIGS. 3 and 4) positioned to engage and roll along opposed variable depth grooves 35A, 35B, 35C and 37A, 37B, 37C formed in both the control ring 20 and the activation ring 32, respectively (see FIGS. 3 and 4). As the control ring 20 is rotated relative to the activation ring 32, the rolling elements 45A, 45B, 45C transverse the opposed control ring grooves 35A, 35B, 35C and activation ring grooves 37A, 37B, 37C either increasing or decreasing the separation distance 47 between the control ring 20 and the activation ring 32 depending on the direction of the relative rotation.

Figure 2:
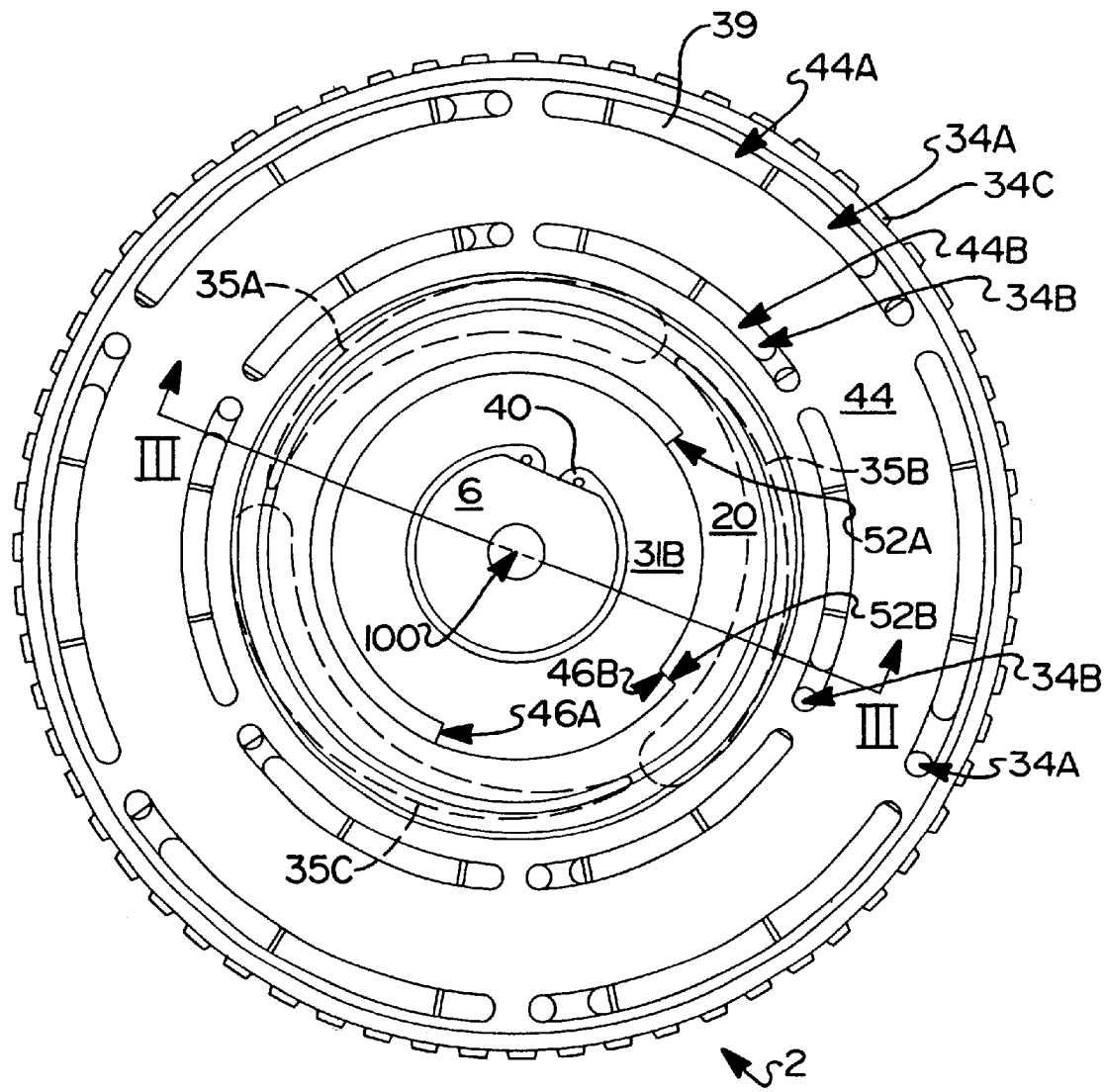
FIG. 2 is a sectional view of the ball ramp actuator of the present invention taken along line II—II of FIG. 1.

The ball ramp mechanism 19 is comprised of a control ring 20, an activation ring 32 and a plurality of rolling elements 45A, 45B, 45C (see FIGS. 3 and 4) positioned to engage opposed variable depth grooves 35A, 35B, 35C formed in both the control ring 20 and variable depth grooves 37A, 37B, 37C formed in the activation ring 32. As the control ring 20 is rotated relative to the activation ring 32, the rolling elements 45A, 45B, 45C (see FIGS. 3, 4 and 5) transverse the opposed control ring grooves 35A, 35B, 35C and activation ring grooves 37A, 37B, 37C thereby either increasing or decreasing the separation distance between the control ring 20 and the activation ring 32 depending on the direction of the relative rotation. The second index plate 31B limits rotation of the control ring 20 when the first index step 46A contacts the first control stop 52A or when the second index step 46B contacts the second control stop 52B. Thus, as shown in FIG. 2, the maximum rotation of the control ring 20 relative to the second index plate 31B is approximately 240 degrees. Since the second index plate 31B is nonrotatably fixed to the input shaft 6, through splines 36, the maximum relative rotation of the control ring 20 relative to the input shaft 6 is also limited by the second index plate 31B. In a similar manner to the operation of the second index plate 31B, the first index plate 31A limits the rotation of the activation ring 32 relative to the input shaft 6 when the first index step 54A contacts the first activation stop 56A (see FIG. 5). With the use of the index plates 31A and 31B, the ball ramp mechanism 19 is activated whenever there is a speed differential between the input shaft 6 and the output hub 8 regardless of the direction of the torque flow through the ball ramp actuator 2 even though the control plate grooves 35A, 35B, 35C and the activation plate-grooves 37A, 37B, 37C are unidirectional.

A second index plate 31B contacts thrust bearing 33D which, in turn, contacts the control ring 20. Both the first and second index plates 31A, 31B are nonrotationally coupled to the input shaft 6 with splines 36.

The actuator plate 22 is attached to the activation extension 24. As the activation plate 32 is displaced to the left by an increase in separation distance between the control ring 20 and the activation ring 32, either the clutch pack 26 or another device is loaded by the actuator plate 22. In this manner, where the ball ramp mechanism 19 is energized, differential rotation between the input shaft 6 and the output shaft 8 results in movement of the actuator plate 22 to the left.

The load of the output hub 8 is borne by the bearing 13A. The activation extension 24 is axially positioned against the thrust bearing 33B which, in turn, contacts a face of the first index plate 31A. A thrust bearing 33C is positioned between the first index plate 31A and the activation ring 32.

The intermediate plate 34 is splined to the output hub 8 to rotate therewith but allowed to move in an axial direction. The intermediate plate 34 is interposed between an activation plate 39 and an armature 44 where the armature 44 is attached to the control ring 20 and thus its rotation relative to the input shaft 6 is also limited by the second index plate 31B. Slip sleeve 27 functions such that when activation ring 32 axially moves to clamp the clutch pack 26 it doesn't drag activation plate 39 with it. Thus, slip sleeve 27 allows activation ring 32 to move axially independently of activation plate 39 but joins the two in a rotational sense. The slip sleeve 27 is retained axially relative to control ring 20 by sump ring 27A but allowed to rotate relative to control ring 20.

The activation ring 32 is splined to rotate with the slip sleeve 27 which is in turn splined to rotate with the activation plate 39. Thus, the activation ring 32, the slip sleeve 27 and the activation plate 39 rotate together but can move axially relative to one another. The activation ring 32 can rotate relative to the input shaft. 6. Also, the control ring 20 can rotate relative to the input shaft 6 and relative to the activation ring 32. Both the control ring 20 and the activation ring 32 are limited in their relative degree of rotation by the index plates 31B and 31A respectively which are splined to the input shaft 6 with splines 36. Index plate 31A is trapped between the thrust bearings 33B and 33C and limits the rotation of the activation ring 32 relative to the input shaft 6. Index plate 31B is trapped between the thrust bearing 33D and snap ring 40 thereby fixing the axial position of the control ring 20. Intermediate plate 34 is connected to the output shaft 8 through the clutch hub 14 while the activation ring 32 and the control ring 20 are through the steps 46A, 46B, 54A, 54B and stops 52A, 52B, 56A, 56B keyed to the input shaft 6 via the index plates 31A, 31B.

The coil assembly 42 is comprised of a multiple turn coil 48 which is partially surrounded by and attached to a stator 49. Both the coil 48 and the stator 49 remain stationary relative to some type of housing (not shown) where the stator 49 is attached to the housing. The armature 44 is attached to and rotates with the control ring 20 with a slight clearance between the armature 44 and the stator 49. For purposes of this application the term "armature" is synonymous with the term "control plate" and are used interchangeably throughout. When the coil 48 is electrically energized by the control unit 50 through signal wires 51, an electromagnetic field is established in the stator 49 which is transferred to the armature (control plate) 44 which, in turn, electromagnetically attracts and frictionally couples the intermediate plate 34 and the activation plate 39. In a certain mode of operation, the activation plate 39 slips relative to the intermediate plate 34 and in another mode of operation the armature 44 slips relative to the intermediate plate 34. In operation, that slippage can switch between the two modes.

The armature 44, intermediate plate 34 and activation plate 39 could have friction material attached to at least one of their respective faces where they make contact with an adjacent element. Thus, a layer of friction material (not shown) would provide the frictional interface between, for example, the armature 44 and the intermediate plate 34 although this is not shown in the preferred embodiment. Intermediate plate 34 is connected to the output shaft 8 through the clutch hub 14 while the activation ring 32 and the control ring 20 are through the steps 46A, 46B, 54A, 54B and stops 52A, 52B, 56A, 56B keyed to the input shaft 6 via the index plates 31A, 31B. As the electrical current in the coil 48 is increased by the control unit 50, the strength of the electromagnetic field induced in the armature 44 is increased and the electromagnetic attraction between the armature 44 and the intermediate plate 34 and the activation plate 39 increases. If the input shaft 6 is rotating at a slower speed the output hub 8, this produces a torque on the armature 44 and activation plate 39 as needed to further actuate the ball ramp mechanism 19 thereby increasing the separation distance between the control ring 20 and the activation ring 32 to axially move the pressure plate 22 and increase the clamp force on the clutch pack 26. The torque will rotate the activation ring 32 or the control ring 20 until index plate 31A or 31B stops one of them and either the control or activation ring 20, 32 can be rotated to further actuate the ball ramp mechanism 19. The control ring 20 can rotate relative to the activation ring 32 and the clamping load on the clutch pack 26 will be increased due to the rotational limiting action of the first and second index plates 31A and 31B. Flux slots 44A and 44B are formed in the armature 44 to enhance the magnetic field properties of the coil assembly 42. Likewise, magnetic flux slots 34A, 34B are formed in the intermediate plate 34 and one central flux slot 39A is formed in the activation plate 39. These flux slots 44A, 44B, 34A, 34B and 39A combine to enhance the magnetic flux properties of the armature 44, the intermediate plate 34 and the activation plate 39 when the coil 48 is electrically energized. In a certain mode of operation, the activation plate 39 slips relative to the intermediate plate 34 and in another mode of operation the armature 44 slips relative to the intermediate plate 34. In operation, that slippage can switch between the two modes.

Now referring to both FIG. 1 and FIG. 2 of the drawings, where FIG. 2 is an elevational view of a portion of the ball ramp actuator 2. The elevational view of FIG. 2 is taken looking into the armature 44 from the right side to the left with the coil 48 removed from the ball ramp actuator 2. Slots 44A and 44B formed in the armature 44 are clearly shown in this view. Also, more clearly shown are portions of the corresponding slots 34A and 34B formed in the intermediate plate 34. The second index plate 31B limits rotation of the control ring 20 when the first index step 46A contacts the first control stop 52A or when the second index step 46B contacts the second control stop 52B. Thus, as shown in FIG. 2, the maximum rotation of the control ring 20 relative to the second index plate 31B is approximately 240 degrees. Activation plate 39 is rotationally joined to the input shaft 6 via the index plate 31B which in one mode, is against a stop 52A and the control ring 20 and the activation ring 32 are positioned such that the rolling elements 45A, 45B, 45C are at the bottom of their respective grooves while the second index plate is on its stop 56B but in the opposite direction. Since the second index plate 31B is nonrotatably fixed to the input shaft 6, through splines 36, the maximum relative rotation of the control ring 20 relative to the input shaft 6 is also limited by the second index plate 31B.

Figure 5:
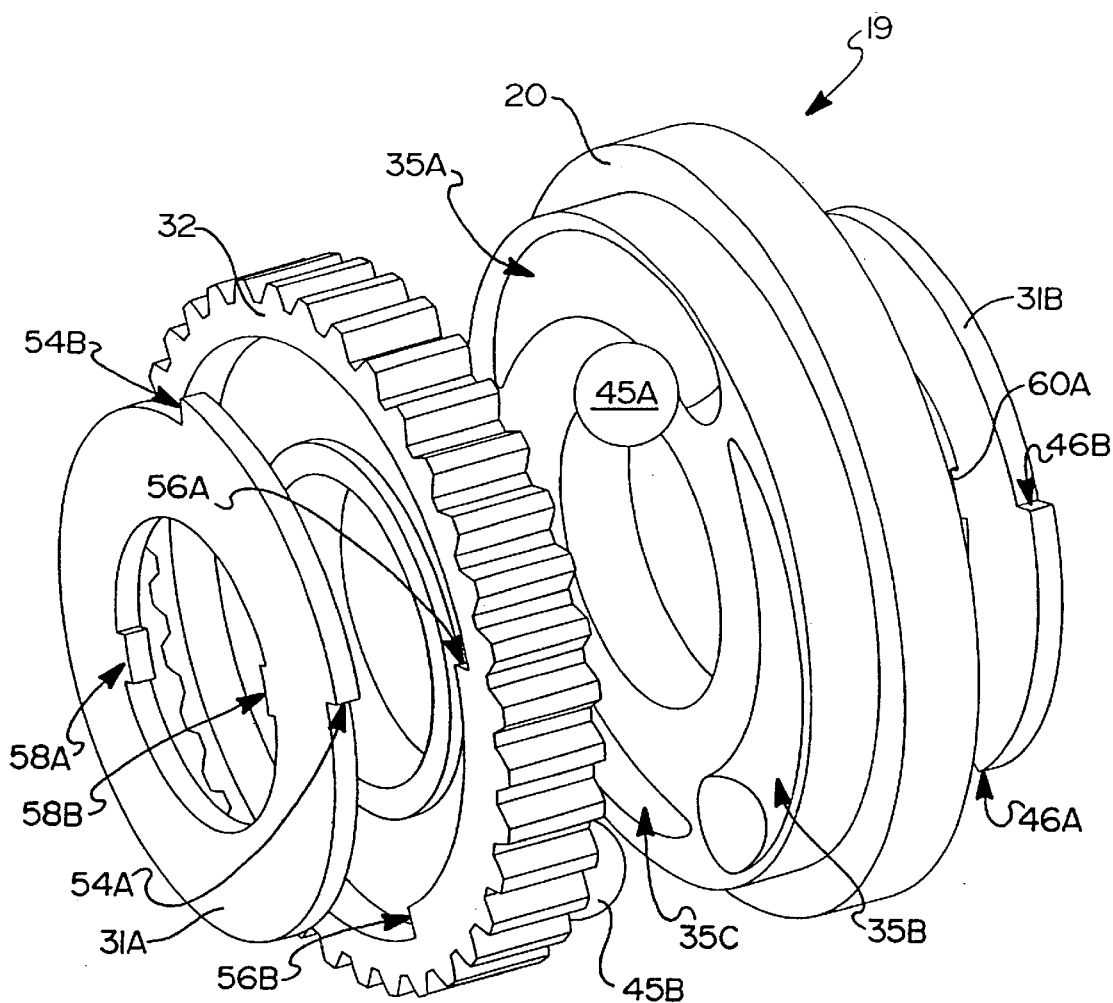
FIG. 5 is a perspective view of the ball ramp mechanism and the indexing plates of the clutch assembly of FIG. 1.

In a similar manner to the operation of the second index plate 31B, the first index plate 31A (see FIG. 5) limits the rotation of the activation ring 32 relative to the input shaft 6 when the first index step 54A contacts the first activation stop 56A (see FIG. 5). With the use of the index plates 31A and 31B, the ball ramp mechanism 19 is activated whenever there is a speed differential between the input shaft 6 and the output shaft 8 regardless of the direction of the torque flow even though the control plate grooves 35A, 35B, 35C and the activation plate grooves 37A, 37B, 37C are unidirectional in that the separation distance 44 can only increase if the control ring 20 is rotated relative to the activation ring 32 in one direction. In a certain mode of operation, the activation plate 39 slips relative to the intermediate plate 34 and in another mode of operation the armature 44 slips relative to the intermediate plate 34. In operation, that slippage can switch between the two modes.

Now referring to FIG. 3 of the drawings, more clearly illustrated are the control grooves 35A, 35B, 35C formed in the control ring 20 and the activation grooves 37A, 37B, 37C formed in the activation ring 32. The control grooves 35A, 35B, 35C at least partially oppose the activation grooves 37A, 37B, 37C and both are of variable depth increasing from one end to the other and extending in opposite relative directions. Rolling elements 45A, 45B, 45C simultaneously contact and roll along respective opposed control grooves 35A, 35B, 35C and activation grooves 37A, 37B, 37C. The rolling elements 45A, 45B, 45C are shown in FIG. 3 in a nonactivated position where each contacts a respective control and activation groove 35A, 35B, 35C; 37A, 37B, 37C at their lowest depth (and minimum overlap) thereby minimizing the axial separation distance 47. As the ball ramp mechanism 19 is activated by electronically energizing the coil 48, assuming there exists slippage in the clutch pack 26, the control ring 20 moves counter-clockwise relative to the activation plate 32 thereby causing the rolling elements 45A, 45B, 45C to transverse the three respective pairs of opposed variable depth control grooves 35A, 35B, 35C and activation grooves 37A, 37B, 37C. As the control plate 20 continues to rotate relative to the activation plate 32, the separation distance 47 increases thereby increasing the clamp force on the clutch pack 26.

FIG. 3 shows the ball ramp mechanism 19 in a nonactivated state and FIG. 4 shows the ball ramp mechanism 19 in an activated state at about fifty percent travel. In FIG. 3, the rolling element 45B is positioned at the maximum depth of both the control groove 35B and the opposed activation groove 37B and the separation distance 47 is at a minimum. Reference point 41B is on the activation groove 37B and reference point 43B is on the control groove 35B for use in comparison to their positions in FIG. 4.

In FIG. 4, the rolling element 45B has traversed both the control groove 35B and the activation groove 37B as the control ring 20 has been rotated relative to the activation ring 32. The separation distance 47 has increased since the rolling element 45B is now contacting a more shallow portion of both the control groove 35B and the activation groove 37B. The relative position of reference points 41B and 43B illustrate the relative rotation.

Now referring to FIG. 5, a partial perspective exploded view of the ball ramp mechanism 19 of the present invention is shown. The control ring 20 includes at least three control grooves 35A, 35B, 35C which vary in axial depth according to rotational location on the face of the control ring 20 and oppose respective variable depth activation grooves 37A, 37B, 37C (see FIGS. 3 and 4) with rolling elements 45A, 45B, 45C trapped between the respective grooves 35A, 35B, 35C; 37A, 37B, 37C. The grooves 35A, 35B, 35C and 37A, 37B, 37C are shaped and oriented such that upon rotation of the control ring 20 relative to the activation ring 32, the axial separation distance 47 between the control and activation rings 20, 32 is increased or decreased.

The rotation of the control ring 20 is limited by action of the second index plate 31B which is keyed to rotate with the input shaft 6 with keys 60A and 60B (not shown) which engage splines 36 (see FIG. 1). The rotation of the control ring 20 is stopped relative to the input shaft 6 when either the first index step 46A contacts the first control stop 52A or when the second index step 46B contacts the second control stop 52B (see FIG. 2).

Likewise, the rotation of the activation ring 32 is limited by action of the first index plate 31A which is also keyed to rotate with the input shaft 6 with keys 58A and 58B which engage the splines 36. The rotation of the activation ring 32 is stopped relative to the input shaft 6 when either the first index step 54A contacts the first activation stop 56A or when the second index step 54B contacts the second activation stop 56B. Note the rotational orientation of the first and second index plates 31A, 31B where the second index stop 52B of the second index plate 31B is in axial alignment with the first index step 54A of the first index plate 31A. Thus, looking from left to right, the activation ring 32 could rotate approximately 240 degrees clockwise and the control ring 20 could rotate approximately 240 degrees counter-clockwise relative to the input shaft 6 to give full ramp travel. The rolling elements 45A, 45B, 45C would traverse their respective control grooves 35A, 35B, 35C and activation grooves 37A, 37B, 37C (not shown) and thereby increase the axial separation distance 47 between the control ring 20 and the activation ring 32 as they rotate relative to each other.

Figure 6:
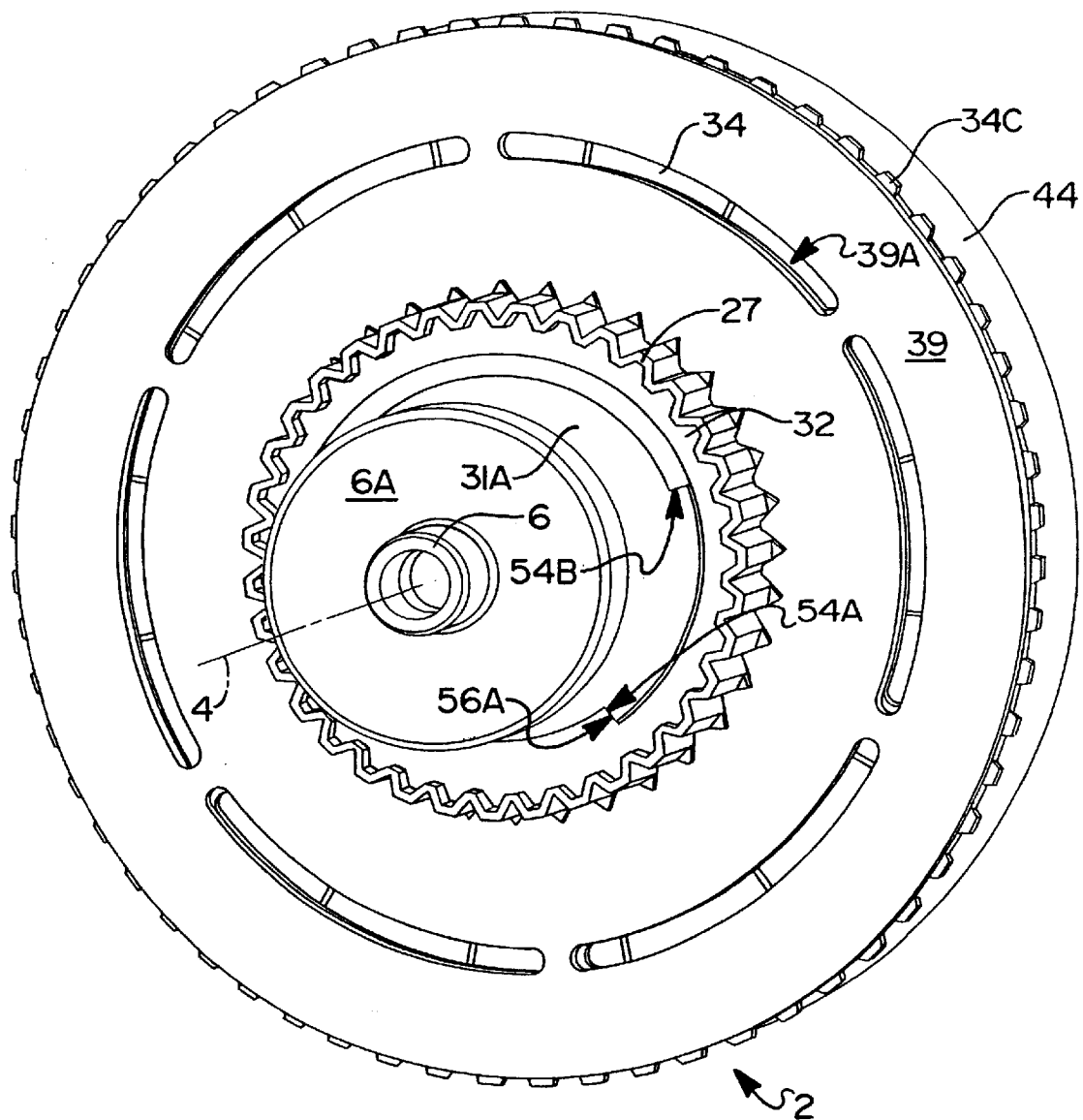
FIG. 6 is a perspective view of a portion of the clutch assembly of FIG. 1.

FIG. 6 is a partial perspective view of the clutch assembly 2 of the present invention looking from left to right as shown in FIG. 1. The axis of rotation 4 extends through the clutch assembly 2 and through the centerline of the input shaft 6. Flange 6A is shown extending from the input shaft 6. The slip sleeve 27 has a multiplicity of tooth shapes formed therein to engage the mating teeth formed in activation ring 32. The teeth 34C of the intermediate plate 34 extend to engage the splines 15 formed in the output hub 8. A small portion of the intermediate plate 34 is visible through the slot 39A formed in the activation plate 39. The outside surface of the armature 44 is also shown. Operation Consider the situation when the torque flow is from the input shaft 6 to the output hub 8 where both the input shaft 6 and output hub 8 are rotating clockwise as viewed from the input shaft 6 and with the coil assembly 42 in an energized state. The activation ring 32 is stopped from rotating relative to the input shaft 6 by the first index plate 31A since the first index stop 54A contacts the first activation stop 56A formed in the activation ring 32 which is keyed to rotate with the input shaft 6 but allowed to move axially relative thereto. In a certain mode of operation, the activation plate 39 slips relative to the intermediate plate 34 and in another mode of operation the armature 44 slips relative to the intermediate plate 34. In operation, that slippage can switch between the two modes depending on the direction of torque flow. The control ring 20 is allowed to rotate in a clockwise direction relative to the input shaft 6 (and the activation ring 32) as the second control stop 52B moves away from the second index step 46B thereby causing the rolling elements 45A, 45B, 45C to transverse their respective opposing variable depth control and activation grooves 35A, 35B, 35C; 37A, 37B, 37C to increase the separation distance 47. This results in an increase in the leftward movement or load on the actuator plate 22 whenever there is relative rotation between the input shaft 6 and the output hub 8 up to some maximum value.

Now consider when the torque flow is reversed and directed from the output hub 8 to the input shaft 6 and the input shaft 6 and the output hub 8 are still rotating clockwise and the coil assembly 42 remains energized but the torque flow is reversed and is being transferred from the output hub 8 into the input shaft 6. In a certain mode of operation, the activation plate 39 slips relative to the intermediate plate 34 and in another mode of operation the armature 44 slips relative to the intermediate plate 34. In operation, that slippage can switch between the two modes. The control ring 20 is stopped from rotating relative to the input shaft 6 by the second index plate 31B since the first control step 46B formed in the control ring 20 contacts the second index stop 52B (see FIG. 2). The second index plate 31B is keyed to rotate with the input shaft 6 but is allowing to move axially leftward relative thereto. Axial movement to the right in FIG. 1 is prevented by the snap ring 40. The activation ring 32 is allowed to rotate in a clockwise direction relative to the input shaft 6 (and the control ring 20) as the second activation stop 56B moves away from the second index step 54B (see FIG. 5) thereby causing the rolling elements 45A, 45B, 45C to transverse the opposing variable depth control and activation grooves 35A, 35B, 35C; 37A, 37B, 37C to increase the separation distance 47. This results in an increase in the leftward movement and/or load on the actuator plate 22 whenever there is relative rotation between the input shaft 6 and the output shaft 8 up to some maximum value.

In general, the input shaft 6 could be any type of rotational input member connected so as to rotate the first and second index plates 31A, 318 and the armature 44 and the drive hub 16. Also, the output hub 8 could be any type of suitable rotational output member connected to rotate with the intermediate plate 34. The ball ramp actuator 2 of the present invention works even if the input shaft 6 and the output shaft 8 are reversed in function.

Although this invention has been described in its preferred form with a certain degree of particularity, it is understood that the preferred disclosure of the preferred form has been made only by way of example in that numerous changes in the details and construction and combination and arrangement of parts may be resorted to without departing from the spirit and the scope of the invention as now claimed.

What is claimed is:
1. A ball ramp actuator comprising:
an input shaft rotating about an axis of rotation;
an output shaft having an axis of rotation;
a ball ramp mechanism for generating a force on a actuator ring comprising; an annular control ring having an axis or rotation, said control ring having a plurality of circumferential control grooves formed in a face of said control ring, said control grooves varying in axial depth, an equivalent number of rolling elements one occupying each of said control grooves, an activation ring having an axis of rotation coaxial with said axis of rotation of said control ring, said activation ring having a plurality of activation grooves substantially identical in number, shape and radial position to said control grooves where said activation grooves at least partially oppose said control grooves and where each of said rolling elements is contained between one of said activation grooves and a respective control groove, said control ring being axially and rotationally moveably disposed relative to said activation ring, said control ring having an annular control plate radially extending therefrom and said activation ring having an annular activation plate radially extending therefrom;
an annular intermediate plate nonrotatably connected to said input shaft and disposed between said control plate and said activation plate;
a coil for creating of an electromagnetic field in a coil pole upon introduction of an electrical current in said coil where said coil pole is adjacent to said control plate;

at least one index ring acting to limit the rotation of said control ring relative to said activation ring;

where upon introduction of an electrical current in said coil an electromagnetic field is generated to frictionally couple said control plate to said intermediate plate and said intermediate plate to said activation plate.

2. The clutch assembly of claim 1 wherein a first index ring controls the rotation of said activation ring and a second index ring controls the rotation of said control ring.

3. The clutch assembly of claim 1 wherein said first and second index plates are nonrotatably connected to said input shaft.

4. The clutch assembly of claim 1 wherein said index ring has a step formed therein which contacts a stop formed in said control ring so as to limit the rotation of said control ring relative to said index plate.

5. The clutch assembly of claim 1 wherein said index ring has a step formed therein which contacts a stop formed in said activation ring so as to limit the rotation of said activation ring relative to said index plate.

6. The clutch assembly of claim 1 wherein said control grooves and said activation ramps are unidirectional.

7. The clutch assembly of claim 1, further comprising a plurality of circumferentially extending slots formed in said intermediate plate.

8. The clutch assembly of claim 1, further comprising a plurality of circumferentially extending slots formed in said control plate.

9. The clutch assembly of claim 1, further comprising a plurality of circumferentially extending slots formed in said activation plate.

10. The clutch assembly of claim 1, further comprising a plurality of circumferentially extending slots formed in said control plate.

11. The clutch assembly of claim 1, further comprising a plurality of circumferentially extending slots formed in said control plate and in said intermediate plate and in said activation plate.

12. A clutch assembly for rotationally coupling two rotatable shafts comprising:

an input shaft rotating about an axis of rotation;

an output shaft having an axis of rotation;

a ball ramp mechanism for generating a clamping force comprising; an annular control ring having an axis of rotation, said control ring having a plurality of circumferential control grooves formed in a face of said control ring, said control ring varying in axial depth, an equivalent number of rolling elements one occupying each of said control grooves, an activation ring having an axis of rotation coaxial with said axis of rotation of said control ring, said activation ring having a plurality of activation grooves substantially identical in number, shape and radial position to said control grooves where said activation grooves at least partially oppose said control grooves and where each of said rolling elements is contained between one of said activation grooves and a respective control groove, said control ring being axially and rotationally moveably disposed relative to said activation plate, said control ring having an annular control plate radially extending therefrom and said activation ring having an annular activation plate radially extending therefrom;

an annular intermediate plate nonrotatably connected to said output shaft and disposed between said control plate and said activation plate;

a coil for creating of an electromagnetic field in a coil pole upon introduction of an electrical current in said coil where said coil pole is magnetically coupled to said control plate and said intermediate plate and said activation plate;

a first index ring acting to limit the rotation of said activation ring relative to said input shaft;

a second index ring acting to limit the rotation of said control ring relative to said input shaft;

where upon introduction of an electrical current in said coil an electromagnetic field is generated to rotationally couple said control plate to said intermediate plate and said intermediate plate to said activation plate.

13. The ball ramp actuator of claim 12 further comprising a slip sleeve rotating with said activation ring and with said activation plate.

14. The ball ramp actuator of claim 12 further comprising an armature nonrotatably connected to said control ring, where when said coil is electrically energized said activation plate and said intermediate plate and said armature are magnetically attracted and frictionally interact to create a torque on said control ring and on said activation ring.

* * * * *